Nov. 24, 1942.  L. WASSON  2,303,183
THERMOCOUPLE AND PILOT BURNER
Filed April 13, 1939
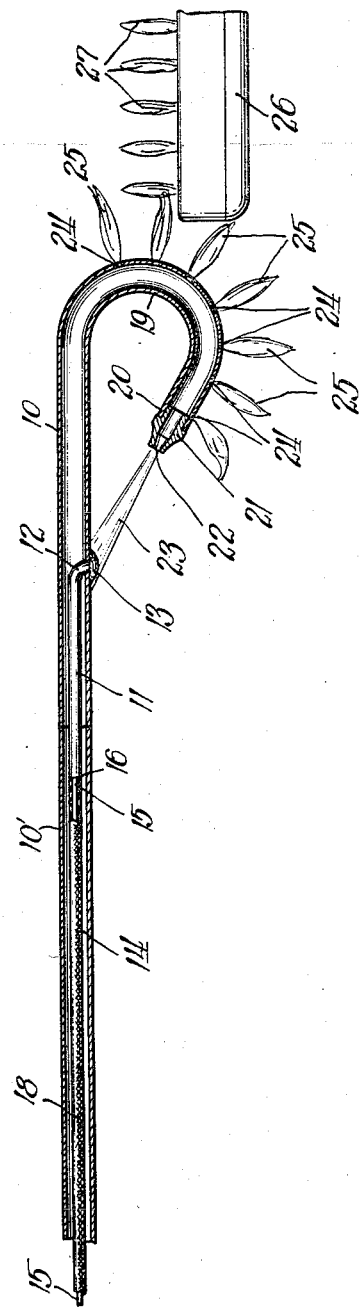
Inventor
Loerwood Wasson.
By Brown, Jackson, Boettcher & Dienner
Attys.

Patented Nov. 24, 1942

2,303,183

UNITED STATES PATENT OFFICE 2,303,183

THERMOCOUPLE AND PILOT BURNER

Loerwood Wasson, Wauwatosa, Wis., assignor to Milwaukee Gas Specialty Company, Milwaukee, Wis., a corporation of Wisconsin Application April 13, 1939, Serial No. 267,734

8 Claims. (Cl. 136—4)

This invention relates to a thermocouple and pilot burner.

One of the main objects of the invention is to provide a combined thermocouple and pilot burner which is effective and reliable in operation and, at the same time, is simple and compact in construction and relatively inexpensive to build, assemble, and install.

It is also an object of the invention to provide a thermocouple and pilot burner as a unitary assembly that may be mounted as a unit, and in which the desired position of the thermocouple relative to the pilot burner is at all times assured; also a device of the character set forth having an improved relation and improved forms of connection between the various parts.

Further objects and advantages of the invention will appear from the following detailed description, taken in connection with the accompanying drawing in which the single figure is a fragmentary detail longitudinal section through a combined thermocouple and pilot burner embodying the present invention.

Referring now in detail to the drawing, the embodiment of the invention selected for illustration comprises an external tubular metallic thermocouple member 10, and an internal thermocouple member 11 of dissimilar metal and disposed within the external member 10. The outer end of the internal thermocouple member 11 is turned laterally at 12 and joined to the external thermocouple member 10 to form a thermal junction 13 which is adapted to be heated by the pilot burner, as will presently be described.

The external thermocouple member 10 is adapted to be connected, for example, in circuit with one side of the winding of the electromagnet of a safety control device of the general character shown and described in John H. Thornbery and Harold A. Mantz Patent No. 2,126,587, issued August 9, 1938, or it may be connected in circuit with any other suitable or preferred device.

The interior of the external tubular thermocouple member 10 forms a gas or fuel way 14 through which the gas or other suitable fuel is conducted to the pilot burner. The internal passage or fuel supply way 14 of the thermocouple member 10 is suitably connected with the fuel supply line 10'—for example, as shown in the Patent 2,189,829 to Guido Wunsch and Josef Schuppert granted Feb. 13, 1940; also in the Patent 2,271,506 to Harold A. Mantz granted Jan. 27, 1942; and in the Patent 2,198,896 to Theodore A. Wetzel granted Apr. 30, 1940, or in any other suitable or preferred manner.

The internal thermocouple member 11 is disposed longitudinally within the external thermocouple member 10 and in position spaced from the wall of the external thermocouple member, or it may be insulated from the external thermocouple in any suitable or preferred manner. Its inner end is joined to the bared end of an internal lead conductor 15 to form an internal cold thermocouple junction at 16. Where an external lead conductor (not shown) is employed in conjunction with the external thermocouple member 10, it may be of tubular form joined to the external thermocouple member 10 to form a second cold thermocouple junction and with its interior communicating with the interior or fuel supply way 14 of the thermocouple member 10 for supplying fuel thereto. In that case, the external tubular lead conductor may be connected in circuit with the winding of the electromagnet in the manner previously described and will constitute a lead connection between one side of the winding of the electromagnet and the external tubular thermocouple 10.

The internal lead conductor 15, which may be covered with insulation as indicated at 18, extends through the tubular thermocouple member 10, and, where an external tubular lead conductor is employed as above set forth, through this external tubular lead conductor to position where it is connected in circuit with the other side of the winding of the electromagnet of the safety control or other device. The external tubular thermocouple member 10 forms an enclosure about the internal thermal junction 16. The internal thermal junction 16 is thus effectively insulated so as to maintain the heat transmitted to said junction when the thermal junction at 13 is heated by the pilot burner, whereby the difference in temperature between the thermal junction at 13 and the internal thermal junction at 16 is more quickly reduced when the heating of the junction 13 is discontinued. This makes for quicker operation of the safety control device to safety position when the pilot flame is extinguished.

The outer end of the external tubular thermocouple member 10 outwardly beyond the thermal junction 13 is of curved or of angular or other suitable form at 19, to dispose the outer end 20 of the member 10 in position directed toward the thermal junction 13. A pilot tip or jet member 21 is secured in the outer end 20 of the tubular member 10.

Where the fuel is of a character, such as gas, requiring admixture of air therewith, the air necessary to provide the desired gaseous mixture is supplied in any suitable or preferred manner. The resulting gaseous mixture or other fuel passes outwardly through the interior of the tubular thermocouple member 10, and issues outwardly through a port 22 at the outer end of the tip 21, and, when ignited, forms the pilot flame 23 which, due to the position of the outer end of the tubular member 10 and the tip 21 carried thereby, impinges upon the thermal junction 13 and heats the same to set up a thermoelectric current.

The curved or otherwise formed portion 19 of the external tubular member 10 has a plurality of apertures or orifices 24. When fuel is flowing outwardly through the member 10, some of the fuel escapes through these orifices 24, and, when ignited, forms pilot flames 25 for lighting the main burner indicated more or less diagrammatically at 26. The main burner flames are indicated at 27.

The safety control device is preferably disposed in the fuel supply line leading to the main burner, and as long as the pilot burner is burning the thermo-electric current set up by the heat of the flame 23 upon the thermal junction 13 generates a thermo-electric current which energizes the electromagnet of the safety control device to hold this device in operating position, permitting fuel to flow to the main burner. A manually or other suitably controlled valve may be provided posterior to the safety control device for controlling the supply of fuel to the main burner. Upon extinguishment of the pilot burner, the electromagnet ceases to be energized sufficiently to hold the safety control device in operating position, and said control device moves to a safety position, shutting off the fuel supply to the main burner 26 and, if desired, also the fuel supply to the pilot burner, although the matter of shutting off the supply of fuel to the pilot burner may be varied widely within the scope of the present invention. This is all fully shown and described in the patent and copending applications herein mentioned, and, therefore, detailed illustration and description of the same will not be repeated here.

I do not intend to be limited to the precise details shown or described.

I claim:

1. A thermocouple and pilot burner comprising an external metallic tubular thermocouple member turned back at its outer end, an internal metallic thermocouple member disposed within and enclosed by said external thermocouple member and joined to said external thermocouple member to form a thermal junction, said external thermocouple member having an inner passage for supplying fuel therethrough, and a tip carried by the outer end of said external thermocouple member and having a port directed toward said thermal junction, said external thermocouple member having pilot port means opening laterally through the wall thereof short of said tip and between said thermal junction and said tip.

2. A thermocouple and pilot burner comprising an external metallic tubular thermocouple member of recurved form at the outer end and having an inner passage for supplying fuel to said outer end, an internal metallic thermocouple member disposed within said external thermocouple member and joined to said external member to form a thermal junction, the recurved portion of said external tubular thermocouple member having pilot burner orifice means opening laterally therethrough, and a tip carried by the outer end of said external tubular thermocouple member and having a port directed toward said thermal junction.

3. A thermocouple and pilot burner comprising an inner metallic thermocouple member and an outer metallic tubular thermocouple member enclosing said inner thermocouple member and joined to said inner thermocouple member to form a thermal junction, said outer tubular thermocouple member constituting a fuel supply tube for a pilot light and being turned back outwardly of said thermal junction and provided with a fuel outlet port adapted for directing a pilot flame upon said thermal junction.

4. A thermocouple and pilot burner comprising an outer metallic tubular thermocouple member and an inner metallic thermocouple member disposed within and enclosed by said outer tubular thermocouple member and joined to said outer thermocouple member short of the outer end of said outer thermocouple member to form a thermal junction, said outer tubular thermocouple member constituting a fuel supply tube for a pilot light and being turned back outwardly of said thermal junction and provided with a fuel outlet port for directing a pilot light back toward said thermal junction.

5. A thermocouple and pilot burner comprising an external metallic tubular thermocouple member of generally recurved form at the outer end and having an inner passage for supplying fuel for a pilot light at the outer end of said external tubular thermocouple member, and an internal metallic thermocouple member disposed within said external thermocouple member and joined to said external thermocouple member short of the outer end thereof to form a thermal junction in position to be heated by the pilot light.

6. A thermocouple and pilot burner comprising an external metallic tubular thermocouple member of generally recurved form at the outer end and having an inner passage for supplying fuel to said outer end, an internal metallic thermocouple member disposed within said external thermocouple member and joined to said external thermocouple member short of the outer end thereof to form a thermal junction, and a tip carried by the outer end of said external tubular thermocouple member and having a port directed toward said thermal junction.

7. A thermocouple and pilot burner comprising an inner metallic thermocouple member and an outer metallic tubular thermocouple member enclosing said inner thermocouple member and joined to said inner thermocouple member to form a "hot" thermojunction, said outer tubular thermocouple member constituting a fuel supply tube for a pilot light, a lead member joined to said inner thermocouple member within said outer tubular thermocouple member to form a "cold" thermojunction disposed within said outer tubular thermocouple member and adapted to be cooled by the unignited fuel delivered to said pilot light, said outer metallic tubular thermocouple member being turned back outwardly of said "hot" thermojunction for maintaining a pilot light directed toward said "hot" thermojunction to heat same by the pilot flame when the pilot light is ignited and to direct the unignited fuel upon said "hot" thermojunction upon extinction of the pilot light so that both "cold" and "hot" junctions are cooled by the unignited feul delivered to said pilot light and rapidly attain substantially the same temperature.

8. A thermocouple and pilot burner comprising an inner metallic thermocouple member and an outer metallic tubular thermocouple member enclosing said inner thermocouple member and joined to said inner thermocouple member to form a "hot" thermojunction, said outer tubular thermocouple member constituting a fuel supply tube for a pilot light, a lead member joined to said inner thermocouple member within said outer tubular thermocouple member to form a "cold" thermojunction disposed within said outer tubular thermocouple member and adapted to be cooled by the unignited fuel delivered to said pilot light, said outer metallic tubular thermocouple member being turned back outwardly of said "hot" thermojunction for maintaining a pilot light having an outlet port directed toward said "hot" thermojunction to heat same by the pilot flame when the pilot light is ignited, said thermocouple being adapted to be connected to energize the operating winding of control mechanism by means of the thermoelectric current produced therein and to deenergize the operating winding of the control mechanism upon extinction of the pilot flame, whereupon both "cold" and "hot" junctions are cooled by the unignited fuel delivered to said pilot light and rapidly attain the same temperature.

LOERWOOD WASSON.

CERTIFICATE OF CORRECTION.

Patent No. 2,303,183.　　　　　　　　　　　　　　　November 24, 1942.

LOERWOOD WASSON.

It is hereby certified that error appears in the printed specification of the above numbered patent requiring correction as follows: Page 3, first column, line 1, claim 7, for "feul" read --fuel--; and second column, line 3, claim 8, strike out "having an outlet port"; and that the said Letters Patent should be read with this correction therein that the same may conform to the record of the case in the Patent Office.

Signed and sealed this 19th day of January, A. D. 1943.

Henry Van Arsdale,
Acting Commissioner of Patents.

(Seal)